US010549445B2

(12) United States Patent
Myrhum, Jr. et al.

(10) Patent No.: US 10,549,445 B2
(45) Date of Patent: Feb. 4, 2020

(54) QUICK CONNECT MECHANISM FOR A DRAW STUD ASSEMBLY

(71) Applicant: Milwaukee Electric Tool Corporation, Brookfield, WI (US)

(72) Inventors: James O. Myrhum, Jr., West Bend, WI (US); Sean T. Kehoe, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 675 days.

(21) Appl. No.: 15/210,334

(22) Filed: Jul. 14, 2016

(65) Prior Publication Data

US 2017/0015016 A1    Jan. 19, 2017

Related U.S. Application Data

(60) Provisional application No. 62/192,308, filed on Jul. 14, 2015.

(51) Int. Cl.
*B26D 7/26* (2006.01)
*B26F 1/44* (2006.01)
*B21D 28/34* (2006.01)

(52) U.S. Cl.
CPC ............. *B26D 7/26* (2013.01); *B21D 28/343* (2013.01); *B26F 1/44* (2013.01)

(58) Field of Classification Search
CPC ... B21D 28/343; Y10T 83/9476; B26F 1/386; F16B 21/02
USPC .................................. 411/418, 437, 349, 554
See application file for complete search history.

(56) References Cited

U.S. PATENT DOCUMENTS

| | | | | |
|---|---|---|---|---|
| 2,735,489 | A | * | 2/1956 | Fowler ................. B21D 28/343 30/360 |
| 2,736,227 | A | * | 2/1956 | Stroble ............... F16B 37/0864 408/241 R |
| 2,742,073 | A | * | 4/1956 | Iannetti ................. F16B 37/085 411/232 |
| 4,380,871 | A | | 4/1983 | Adleman |
| 4,479,748 | A | * | 10/1984 | Uhlmann .............. F16B 37/085 411/412 |
| 4,609,314 | A | * | 9/1986 | Metz ..................... F16B 5/0208 411/105 |

(Continued)

OTHER PUBLICATIONS

Greenlee, "Speed Lock for rectangular and square punches", 2013 (4 pages).

(Continued)

*Primary Examiner* — Matthieu F Setliff
(74) *Attorney, Agent, or Firm* — Michael Best & Friedrich LLP (57) ABSTRACT

A draw stud assembly for use with a knockout punch tool having a movable piston, includes a connector attachable to the movable piston, a draw stud, and a quick connect mechanism. The quick connect mechanism includes mating first and second thread segments on the connector and the draw stud, respectively. The connector and the draw stud are movable between a first relative orientation where the mating first and second thread segments are misaligned to permit axial movement between the connector and the draw stud, and a second relative orientation where the mating first and second thread segments are aligned and engaged to inhibit axial movement between the connector and the draw stud.

18 Claims, 9 Drawing Sheets

(56) References Cited

U.S. PATENT DOCUMENTS

| | | | |
|---|---|---|---|
| 4,724,616 A | | 2/1988 | Adleman et al. |
| 4,781,507 A | * | 11/1988 | Duenas .................... B25B 5/10 |
| | | | 269/185 |
| 5,020,407 A | * | 6/1991 | Brinlee .................. B21D 28/12 |
| | | | 83/530 |
| 6,142,052 A | | 11/2000 | Endo |
| 6,682,267 B1 | * | 1/2004 | Jones ...................... E02D 5/523 |
| | | | 405/230 |
| 6,817,810 B2 | * | 11/2004 | Jones ...................... E02D 5/523 |
| | | | 405/230 |
| 6,981,327 B2 | | 1/2006 | Nordlin |
| 8,904,911 B2 | | 12/2014 | Nordlin |
| 9,255,601 B2 | * | 2/2016 | Frenken ................ F16B 37/085 |
| 9,610,696 B2 | * | 4/2017 | Nordlin ................ B21D 28/343 |
| 2010/0180744 A1 | | 7/2010 | Nordlin |
| 2011/0150562 A1 | | 6/2011 | Lutz et al. |
| 2011/0277610 A1 | | 11/2011 | Nordlin et al. |
| 2013/0047813 A1 | | 2/2013 | Kehoe et al. |
| 2013/0202381 A1 | | 8/2013 | Frenken |
| 2013/0240615 A1 | | 9/2013 | Thomson |
| 2013/0305544 A1 | | 11/2013 | Haase |
| 2015/0151349 A1 | * | 6/2015 | Nordlin ................ B21D 28/343 |
| | | | 83/686 |

OTHER PUBLICATIONS

International Search Report and Written Opinion for Application No. PCT/US2016/042255 dated Sep. 12, 2016 (13 pages).
European Patent Office Extended Search Report for Application No. 16825167.6 dated Feb. 12, 2019, 7 pages.

* cited by examiner

QUICK CONNECT MECHANISM FOR A DRAW STUD ASSEMBLY

CROSS-REFERENCE TO RELATED APPLICATIONS

This application claims priority to U.S. Provisional Patent Application No. 62/192,308 filed on Jul. 14, 2015, the entire contents of which are incorporated by reference herein.

FIELD OF THE INVENTION

The invention relates to quick connect mechanisms, and more particularly to quick connect mechanisms for draw stud assemblies.

BACKGROUND OF THE INVENTION

Draw stud assemblies are typically used in conjunction with a knockout punch tool for creating holes in a workpiece. Such draw stud assemblies usually include a draw stud, a punch threaded to a first end of the draw stud, a die through which the draw stud extends, and a connector threaded to a second end of the draw stud to facilitate attachment of the draw stud assembly to a movable piston of the punch tool. In operation, the punch is first threaded to the first end of the draw stud, and the draw stud is inserted through a pre-made hole in the workpiece having a nominal diameter sufficient to fit the draw stud. The die is then inserted over the draw stud and onto the workpiece, with the threaded second end of the draw stud protruding through a hole in the die. The connector is then threaded to the second end of the draw stud to secure the draw stud assembly onto the workpiece, and the connector is attached to the movable piston of the punch tool before the punch tool is actuated. After the punch creates a hole in the workpiece, the draw stud assembly must be disassembled by unthreading the connector, the punch, or both from the draw stud before being reassembled again for a subsequent punching operation.

SUMMARY OF THE INVENTION

The invention provides, in one aspect, a draw stud assembly for use with a knockout punch tool having a movable piston. The draw stud assembly includes a connector that is attachable to the movable piston, a draw stud, and a quick connect mechanism including mating first and second thread segments on the connector and the draw stud, respectively. The connector and the draw stud are movable between a first relative orientation where the mating first and second thread segments are misaligned to permit axial movement between the connector and the draw stud, and a second relative orientation where the mating first and second thread segments are aligned and engaged to inhibit axial movement between the connector and the draw stud.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
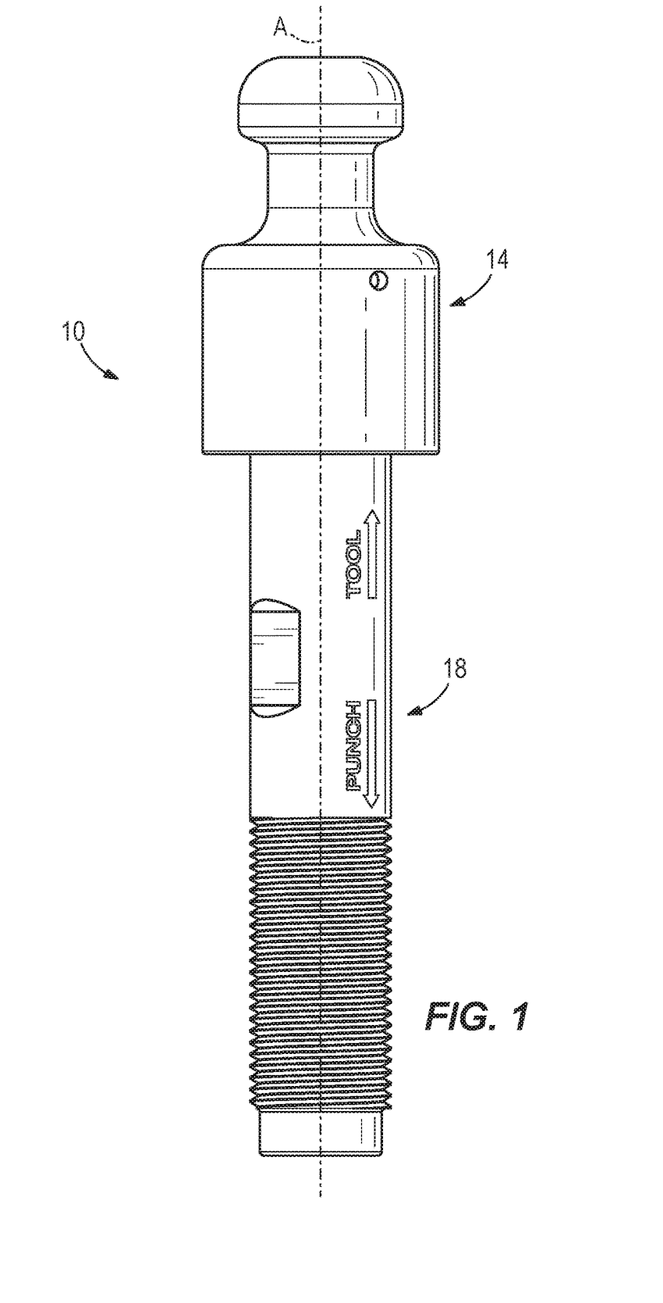
FIG. 1 is a side view of a draw stud assembly in accordance with an embodiment of the invention.

FIG. 1 illustrates a draw stud assembly 10 for use with a knockout punch tool (not shown) in punching holes in a workpiece. The assembly 10 includes a draw stud 18 defining a longitudinal axis A and a removable connector, which in the illustrated embodiment of FIG. 1 is a ball pull 14, that secures the draw stud 18 to the knockout punch tool.

Figure 2:
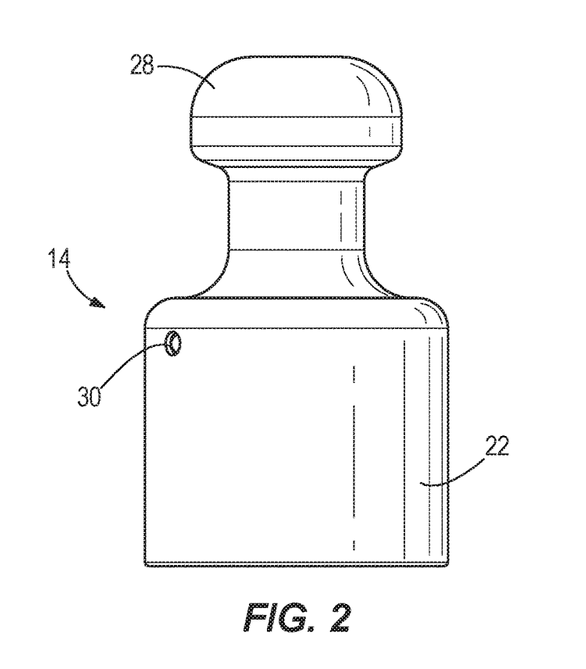
FIG. 2 is a side view of a ball pull of the draw stud assembly of FIG. 1.
Figure 3:
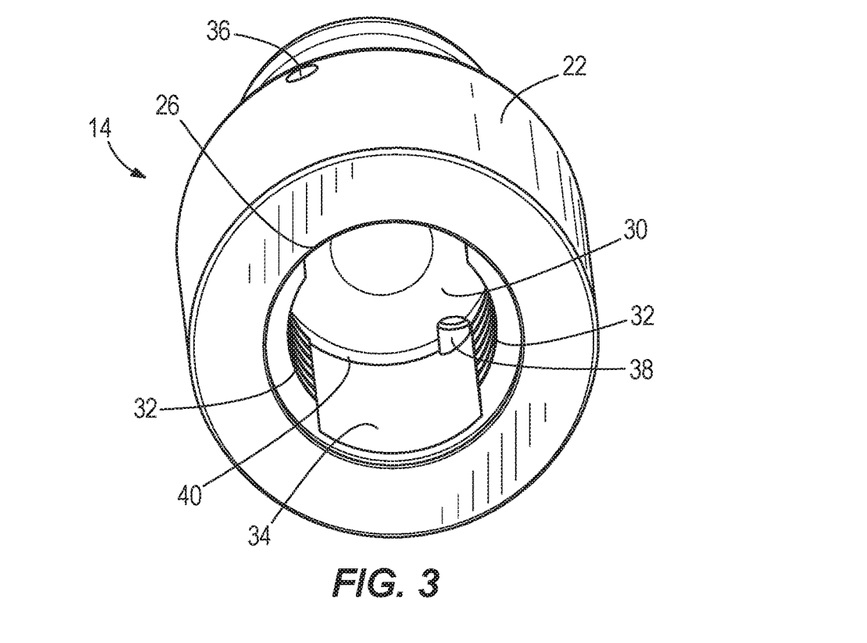
FIG. 3 is a bottom perspective view of the ball pull of FIG. 2.

With reference to FIGS. 2 and 3, the ball pull 14 includes a cylindrical body 22 having a cylindrical bore 26 defined at least partially by a back wall 30, and a ball or spherical-shaped portion 28 integrally formed with the cylindrical body 22 that is attachable to a piston of the knockout punch tool. The ball pull 14 also includes a pair of opposed coarse thread segments 32 formed within the bore 26 and a pair of opposed unthreaded portions 34 directly adjacent the coarse thread segments 32 that extend the length of the bore 26. The individual threads in each thread segment 32 may be helical (i.e., define a helix angle relative to a longitudinal axis of the ball pull 14) or oriented transverse to the longitudinal axis of the ball pull 14. The bull pull 14 further includes an unthreaded, annular groove 40 that extends circumferentially around the bore 26 and is located axially between the coarse thread segments 32 and the back wall 30. Additionally, the ball pull 14 includes a pair of bores 36 (only one of which is shown in each of FIGS. 2 and 3) extending through the cylindrical body 22, communicating the cylindrical bore 26 and an outer periphery of the body 22. Respective stop lugs 38 (only one of which is shown in FIG. 3) are received within the bores 36, with distal ends of the stop lugs 38 extending into the cylindrical bore 26 and positioned in the annular groove 40 adjacent the back wall 30 and the respective thread segments 32. In the illustrated embodiment of the draw stud assembly 10, the stop lugs 38 are configured as pins interference or press-fit within the respective bores 36. Alternatively, the stop lugs 38 may be integrally formed with the body 22. As a further alternative, the bores 36 and the stop lugs 38 may have corresponding threads, and the stop lugs 38 are threaded within the bores 36.

Figure 4:
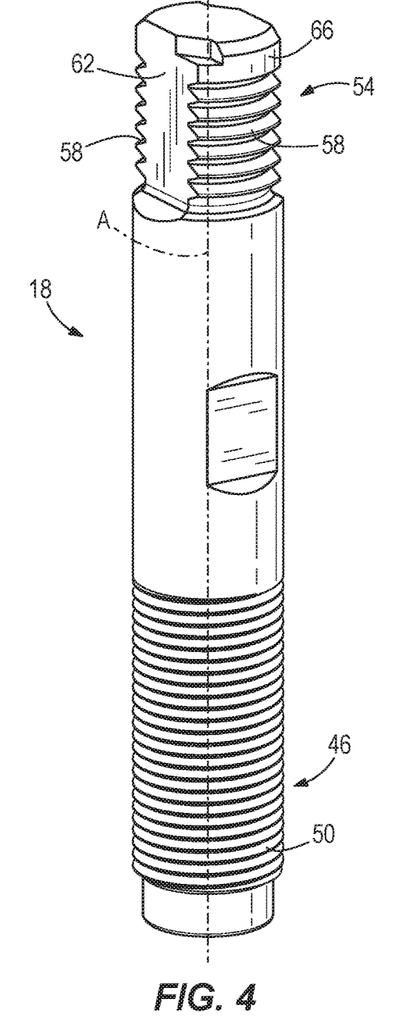
FIG. 4 is a perspective view of a draw stud of the draw stud assembly of FIG. 1.

With reference to FIG. 4, the draw stud 18 includes a first end 46 having fine threads 50 that are engageable with corresponding threads of a cutter (not shown), and an opposite, second end 54 having a pair of coarse thread segments 58 that are engageable with the respective coarse thread segments 32 of the ball pull 14. The individual threads in each thread segment 58 may be helical (i.e., define a helix angle relative to the longitudinal axis A of the draw stud 18) or oriented transverse to the longitudinal axis A of the draw stud 18. The draw stud 18 also includes opposed unthreaded portions or flats 62 adjacent the thread segments 58. The flats 62 are positioned on opposite sides of the axis A (FIG. 5), permitting the second end 54 of the draw stud 18 to be inserted axially into the bore 26 when the flats 62 are aligned with the thread segments 32 of the ball pull 14. The draw stud 18 further includes a control thread segment 66 adjacent each of the thread segments 58, and a notch 70 in each of the control thread segments 66 into which the stop lugs 38 are receivable. The control thread segments 66 are configured to be rotatable within the annular groove 40 and have a thickness T that is greater than a pitch P between individual threads in the coarse thread segments 32, 58 of the ball pull 14 and the draw stud 18. Therefore, the control thread segments 66 inhibit relative rotation between the ball pull 14 and the draw stud 18 until the second end 54 of the draw stud 18 is fully inserted within the cylindrical bore 26, with the control thread segments 66 positioned adjacent the back wall 30 and within the annular groove 40.

Figure 5:
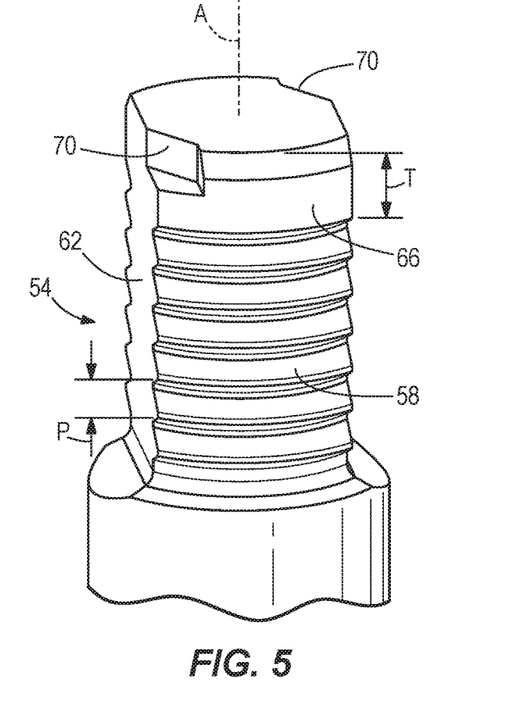
FIG. 5 is an enlarged perspective view of a portion of the draw stud of FIG. 4.

With reference to FIGS. 3 and 5, a combination of the thread segments 32, 58 on the ball pull 14 and the draw stud 18, respectively, defines a quick connect mechanism that facilitates quick removal and reattachment of the ball pull 14 from the draw stud 18, as opposed to using a conventional threaded arrangement between the ball pull 14 and the draw stud 18. The ball pull 14 is rotatable about the axis A relative to the draw stud 18 between a first relative orientation in which the ball pull 14 is unlocked from the draw stud 18, and a second relative orientation in which the ball pull 14 is locked to the draw stud 18. In the first relative orientation, the thread segments 58 of the draw stud 18 are misaligned with the thread segments 32 of the ball pull 14. More specifically, the thread segments 58 of the draw stud 18 are received by and in facing relation with the unthreaded portions 34 of the ball pull 14, and the thread segments 32 of the ball pull 14 are adjacent to and in facing relation with the flats 62 of the draw stud 18, thus allowing the second end 54 of the draw stud 18 to be axially inserted within and removable from the cylindrical bore 26 in the ball pull 14. Also in the first relative orientation, the stop lugs 38 are received within the respective notches 70. In the second relative orientation, the thread segments 58 of the draw stud 18 are engaged with the thread segments 32 of the ball pull 14 and the stop lugs 38 contact the respective flats 62, thereby limiting the extent to which the thread segments 32, 58 can engage by an amount equal to an arc length of the thread segments 32, 58 (e.g., by approximately 90 degrees).

Figure 6:
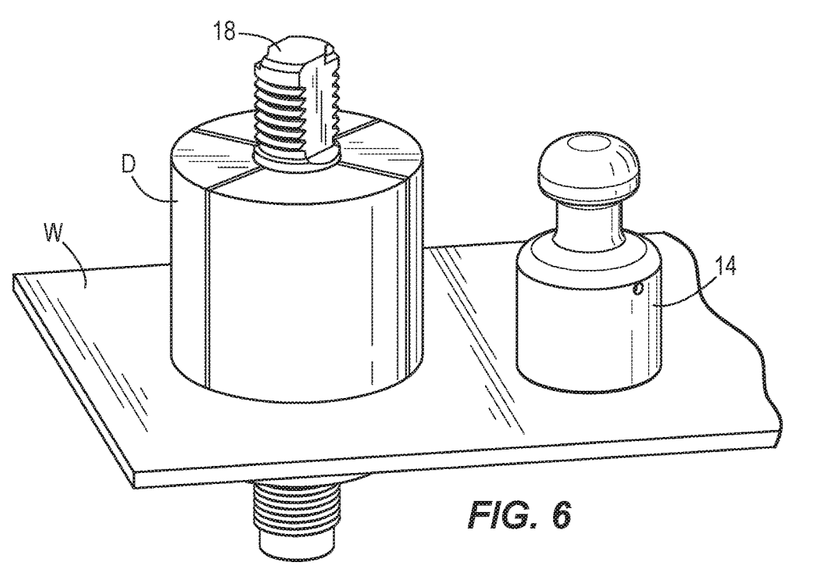
FIG. 6 is a perspective view of the draw stud assembly of FIG. 1, shown with the ball pull detached from the draw stud, positioned on a workpiece.
Figure 7:
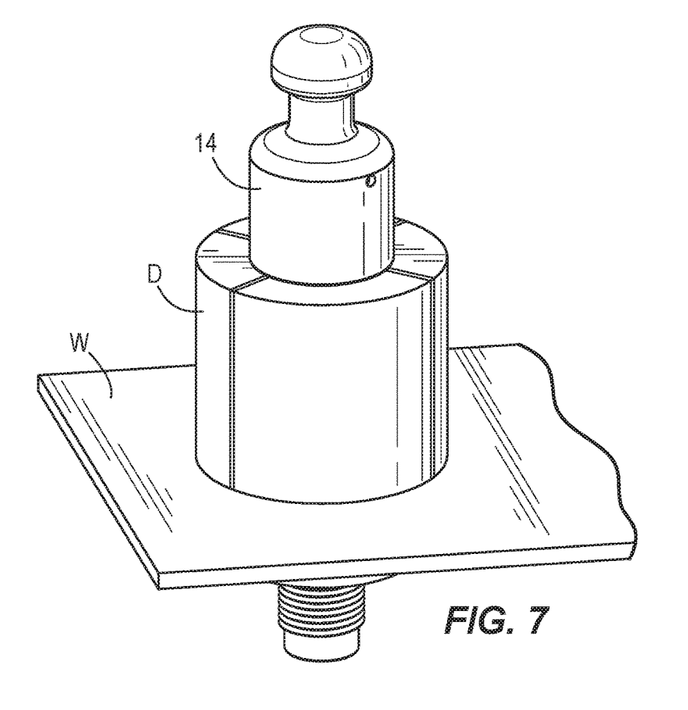
FIG. 7 is a perspective view of the draw stud assembly of FIG. 1, shown with the ball pull attached to the draw stud, positioned on the workpiece and ready for a punching operation.
Figure 8:
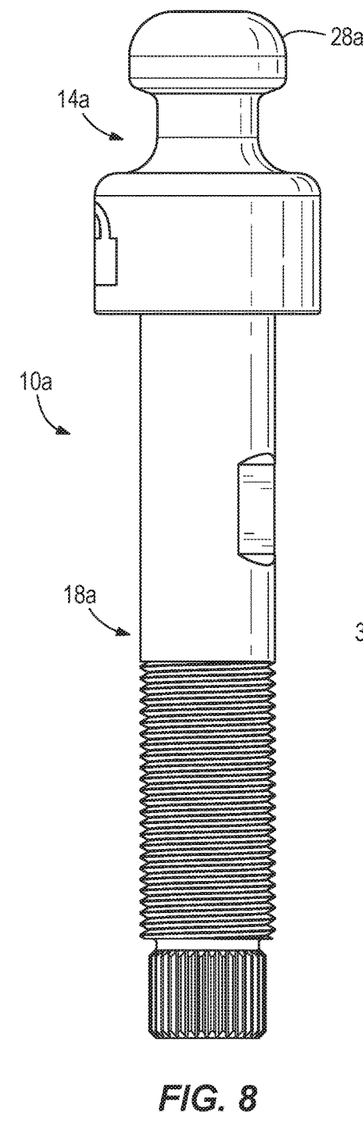
FIG. 8 is a side view of a draw stud assembly in accordance with another embodiment of the invention.

With reference to FIGS. 6 and 7, the draw stud 18 is insertable through a pre-formed hole in a workpiece W having a diameter at least nominally greater than that of the draw stud 18. A cutter (not shown) is threaded to the first end 46 of the draw stud 18 (via the fine threads 50) and may remain attached to the draw stud 18 between consecutive hole-punching operations performed on the workpiece W. Then, a die D is positioned atop the workpiece W with the second end 54 of the draw stud 18 protruding from the die D (FIG. 6). The draw stud 18 with attached cutter is then ready to be attached to the ball pull 14.

Prior to inserting the second end 54 of the draw stud 18 into the cylindrical bore 26, the thread segments 58, 32 of the draw stud 18 and the ball pull 14, respectively, must be positioned in the first relative orientation. The second end 54 of the draw stud 18 is then axially inserted into the cylindrical bore 26 until the second end 54 contacts the back wall 30, at which instant the control thread segments 66 on the draw stud 18 are aligned with the annular groove 40 and the stop lugs 38 are received in the respective notches 70. The ball pull 14 is then rotated relative to the draw stud 18 about the axis A, in a first direction toward the second relative orientation, thereby engaging the thread segments 32, 58 to lock the ball pull 14 to the draw stud 18. The stop lugs 38 contact the respective flats 62 and limit the extent to which the ball pull 14 may be rotated relative to the draw stud 18, thereby indicating the ball pull 14 and the draw stud 18 are in the second relative orientation and the thread segments 32, 58 are fully engaged. Accordingly, the ball pull 14 is rotatable by an amount equal to an arc length of the thread segments 58, 32 (e.g., by approximately 90 degrees). Because the thickness T of the control thread segments 66 is greater than the pitch P between individual threads in the thread segments 32 on the ball pull 14, the control thread segments 66 ensure that the draw stud 18 cannot be prematurely rotated upon insertion into the bore 26 (FIG. 5). Upon the ball pull 14 reaching the second relative position (shown in FIG. 7), it becomes locked to the draw stud 18 to thereby inhibit relative axial movement between the ball pull 14 and the draw stud 18. Thereafter, the ball pull 14 may be attached to a piston of a knockout punch tool (via an intermediate connector having a radial recess through which the ball-shaped portion 28 is insertable) to initiate a hole-punching operation.

To disconnect the ball pull 14 from the draw stud 18, the ball pull 14 is rotated an opposite, second direction back toward the first relative orientation until the stop lugs 38 are received in the respective notches 70 limiting further rotation, thereby disengaging the thread segments 32, 58 so that the ball pull 14 may be quickly removed from the second end 54 of the draw stud 18 (FIG. 6). Thereafter, the die D may be lifted from the workpiece W and the draw stud 18 may be repositioned to another pre-formed hole in the workpiece W (with the cutter remaining attached) for a subsequent hole-punching operation. In this manner, the draw stud assembly 10 may be quickly moved between consecutive hole-punching operations.

It should be understood that, in some embodiments, the stop lugs 38 may be positioned on the draw stud 18 and the notches 70 may be defined within the bore 26 of the ball pull 14. Additionally, in some embodiments, there may be any number of corresponding thread segments 32, 58 that may be rotated into and out of engagement on the ball pull 18 and the draw stud 14, respectively.

FIGS. 8-11 illustrate a draw stud assembly 10a in accordance with another embodiment of the invention. Like components and features are identified with like reference numerals plus the letter "a" and will not be described again in detail. The draw stud assembly 10a of FIGS. 8-11 is substantially identical to the draw stud assembly 10 of FIGS. 1-7. However, the quick connect mechanism defined by the second end 54a of the draw stud 18a, and the bore 26a of the ball pull 14a is different. Therefore, only this difference between the two embodiments will be described in detail. The manner of operation of the draw stud assembly 10a of FIGS. 8-11 is essentially identical to that described above in connection with the draw stud assembly 10 of FIGS. 1-7.

Figure 9:
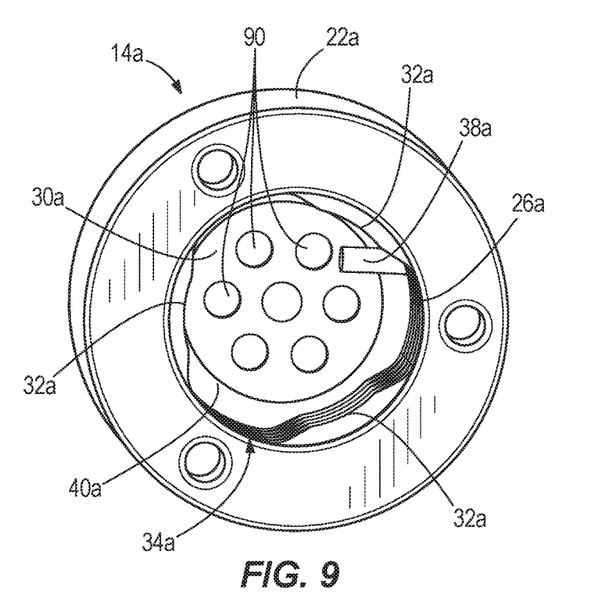
FIG. 9 is a bottom perspective view of a ball pull of the draw stud assembly of FIG. 8.

With reference to FIG. 9, the ball pull 14a includes several coarse thread segments 32a formed within the bore 26a that are evenly circumferentially spaced about the axis A (FIG. 10), and several unthreaded portions 34a directly adjacent the coarse thread segments 32a, extending the length of the bore 26a. In some embodiments, the individual threads in each thread segment 32a may be helical (i.e., define a helix angle relative to a longitudinal axis of the ball pull 14a) or oriented transverse to the longitudinal axis of the ball pull 14a. In the illustrated embodiment, there are three opposed coarse thread segments 32a and three unthreaded portions 34a that are spaced approximately 120 degrees apart about the axis A around the bore 26a. In the illustrated embodiment, there is only one stop lug 38a. However, in some embodiments, there may be two or three stop lugs 38a, each spaced approximately 120 degrees apart.

Figure 10:
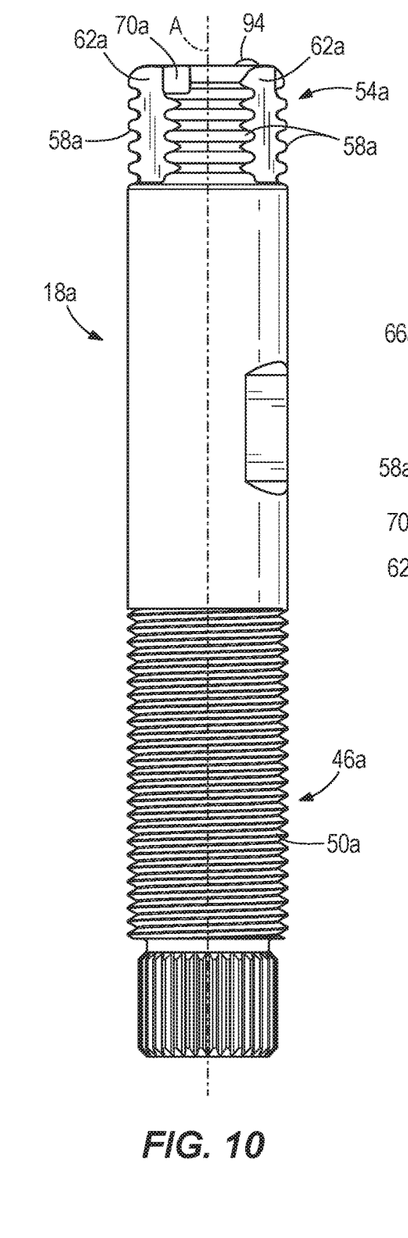
FIG. 10 is a perspective view of a draw stud of the draw stud assembly of FIG. 8.
Figure 11:
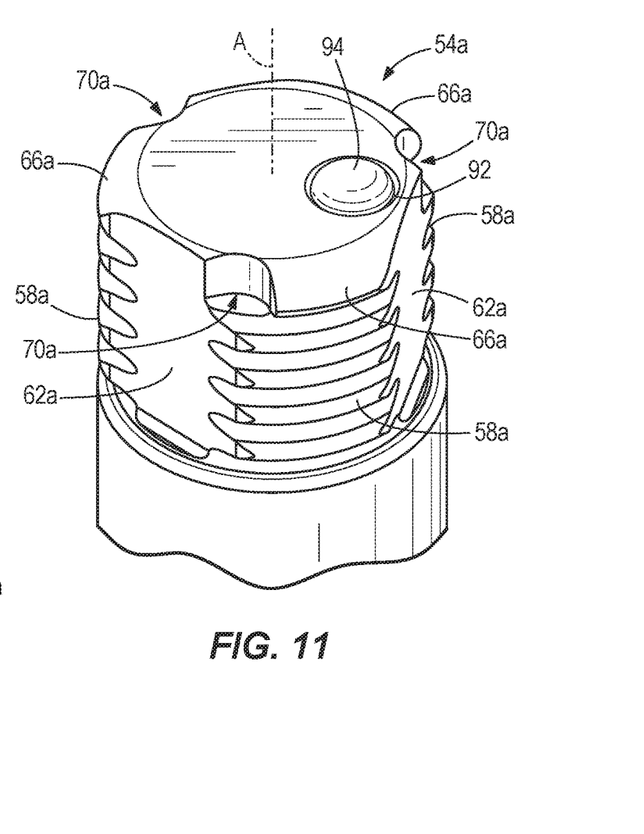
FIG. 11 is an enlarged perspective view of a portion of the draw stud of FIG. 10.

With reference to FIGS. 10-11, the second end 54a of the draw stud 14a includes several coarse thread segments 58a that are evenly circumferentially spaced about the axis A, and engageable with the respective coarse thread segments 32a of the ball pull 14a. In some embodiments, the individual threads in each thread segment 58a may be helical (i.e., define a helix angle relative to the longitudinal axis A of the draw stud 18a) or oriented transverse to the longitudinal axis A of the draw stud 18a. The draw stud 18a also includes unthreaded portions or flats 62a adjacent the thread segments 58a. In the illustrated embodiment, there are three flats 62a that are approximately 120 degrees apart about the axis A. Likewise, three coarse thread segments 58a alternate with the flats 62a and are also approximately 120 degrees apart about the axis A (FIG. 11). The flats 62a and the coarse thread segments 58a of the draw stud 18a are configured to permit the second end 54a of the draw stud 18a to be inserted axially into the bore 26a when the flats 62a are aligned with the thread segments 32a of the ball pull 14a.

The draw stud 18a further includes a control thread segment 66a adjacent each of the three thread segments 58a, and a notch 70a defined in each of the control thread segments 66a into which the stop lugs 38a are receivable. Similar to the draw stud assembly 10 of FIGS. 1-7, the control thread segments 66a inhibit relative rotation between the ball pull 14a and the draw stud 18a until the second end 54a of the draw stud 18a is fully inserted within the cylindrical bore 26a, with the control thread segments 66a positioned adjacent the back wall 30a and within the annular groove 40a.

The three notches 70a are evenly circumferentially spaced about the axis A (i.e., the notches 70a are spaced by approximately 120 degrees). The notches 70a are configured such that the stop lug 38a is received within one of the notches 70a when the draw stud 18a is inserted into the bore 26a of the ball pull 14a while the thread segments 32a, 58a are in a first relative orientation. When the draw stud 18a is rotated relative to the ball pull 14a into the second relative orientation, the stop lug 38a contacts a corresponding one of the flats 62a. Accordingly, the notches 70a and the flats 62a inhibit the draw stud 18a and the ball pull 14a from being rotated beyond the first and second relative orientations by limiting the extent which the thread segments 32a, 58a can engage by an amount equal to an arc length of the thread segments 32, 58a. In the illustrated embodiment, the draw stud 18a and the ball pull 14a may be rotated relative to one another by approximately 60 degrees about the axis A between the first and second relative orientations.

With continued reference to FIGS. 9-11, the quick connect mechanism further includes six detent recesses 90 defined in the back wall 30a and evenly circumferentially spaced about the axis A (i.e., the detent recesses 90 are spaced by approximately 60 degrees). The quick connect mechanism further includes a bore 92 defined in the second end 54a of the draw stud 18a extending parallel to the axis A, a detent 94 within the bore 92, and a biasing member (e.g., a compression spring, not shown) that biases the detent 94 upward from the frame of reference of FIG. 11 to protrude from the bore 92 toward the ball pull 14a in a direction parallel to axis A. In the illustrated embodiment, the detent 94 is shaped as a sphere or ball. The detent 94 may be received in any one of the detent recesses 90 when the second end 54a of the draw stud 18a is inserted into the bore 26a of the ball pull 14a in the first relative orientation. When relatively rotating the draw stud 18a and the ball pull 14a from the first relative orientation to the second relative orientation, the detent 94 is urged out of a first one of the detent recesses 90 against the bias of the biasing member, until the draw stud 18a and the ball pull 14a are rotated into the second relative orientation where the detent 94 is biased into an adjacent detent recess 90. Accordingly, the detent 94 and the detent recesses 90 provide a tactile indication that the draw stud 18a and the ball pull 14a have been fully rotated into the second relative orientation and the thread segments 32a, 58a are fully engaged. Similarly, the detent 94 is urged out of the second one of the recesses 90 and biased into the first one of the recesses 90 when the draw stud 18a and the ball pull 14a are returned to the first relative orientation to provide a tactile indication that the draw stud 18a and the ball pull 14a are in the first relative orientation and the thread segments 32a, 58a are fully disengaged. In addition, the detent 94 inhibits the draw stud 18a and the ball pull 14a from being inadvertently moved from the second relative orientation to the first relative orientation.

Figure 13:
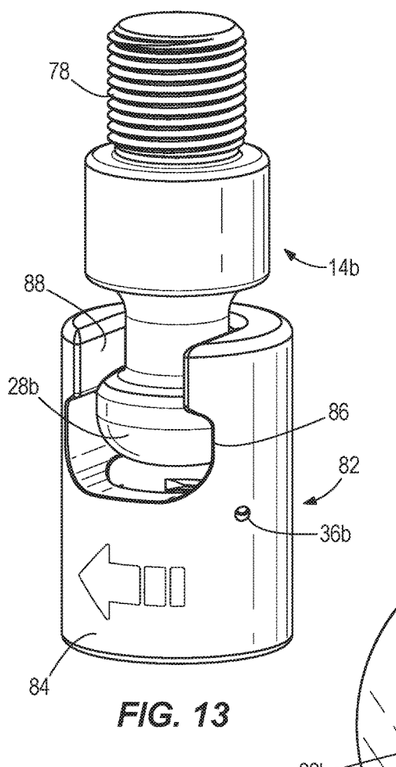
FIG. 13 is a side view of a connector and a ball pull of the draw stud assembly of FIG. 12.
Figure 14:
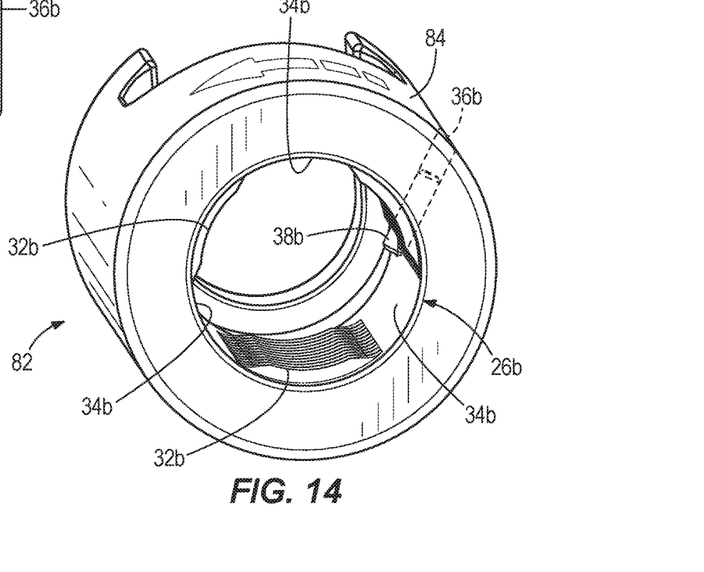
FIG. 14 is a bottom perspective view of the ball pull of FIG. 13
Figure 15:
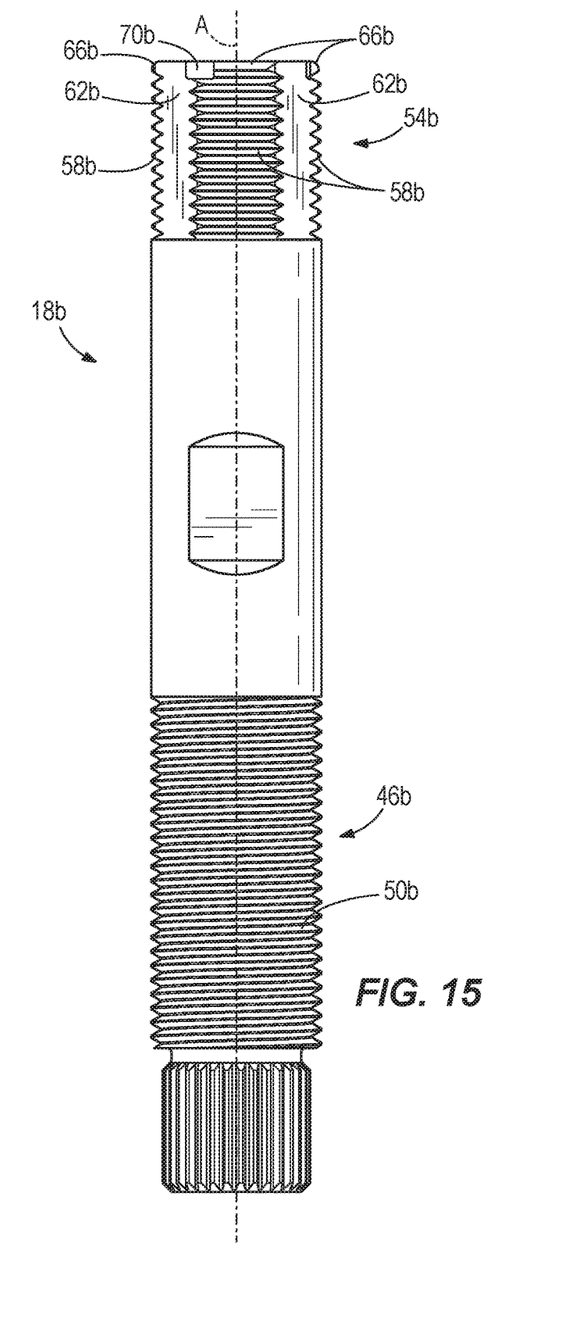
FIG. 15 is a side view of a draw stud of the draw stud assembly of FIG. 12.

FIGS. 12-15 illustrate a draw stud assembly 10b in accordance with another embodiment of the invention. Like components and features are identified with like reference numerals plus the letter "b" and will not be described again in detail. With the exception of the second end 54b of the draw stud 18b having an increased threaded length, as shown in FIG. 15, the draw stud 18b of FIGS. 12-15 is substantially similar to the draw stud 18a of FIGS. 8-11. Also, in the draw stud assembly 10b of FIGS. 12-15, an intermediate connector 82 is positioned between the draw stud 18b and the ball pull 14b. Therefore, only these differences will be described in detail.

Figure 12:
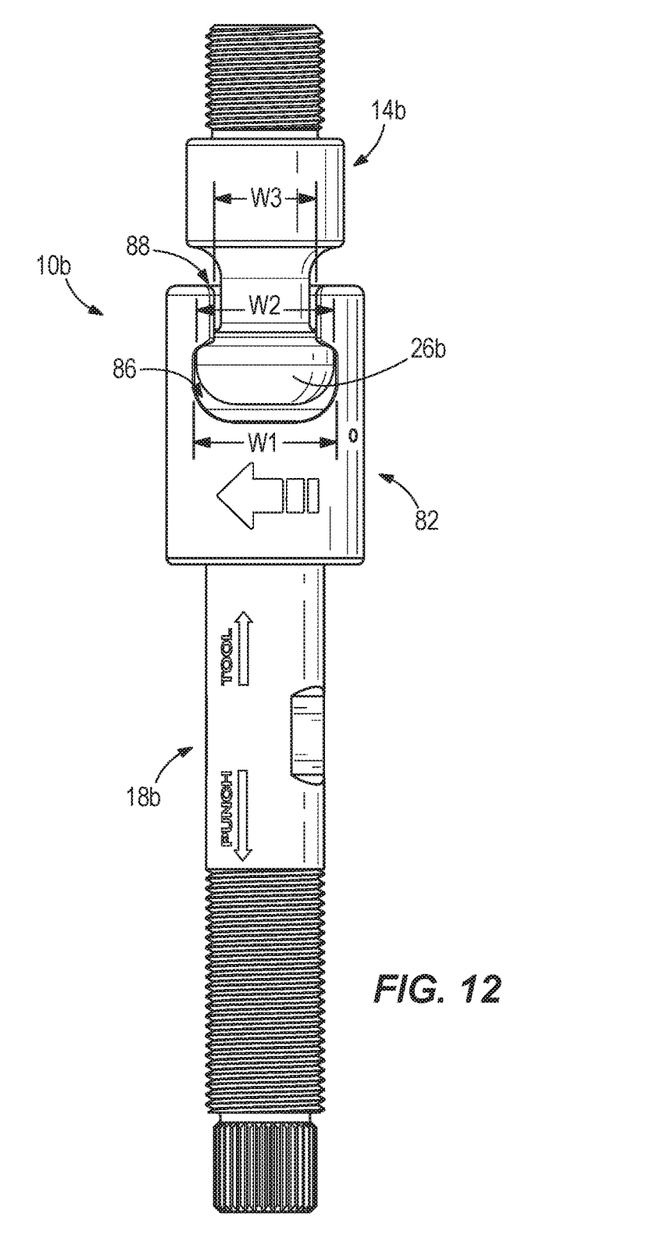
FIG. 12 is a side view of a draw stud assembly in accordance with yet another embodiment of the invention.

With reference to FIG. 13, on the opposite end of the ball-shaped portion 28b, the ball pull 14b includes a threaded end 78 for directly connecting the ball pull 14b to a piston of a knockout punch or driver. The draw stud assembly 10b further includes an intermediate connector 82 having a cylindrical body 84 that defines a recess 86 therein. The cylindrical body 84 further defines an axial opening 88 that is axially aligned with the bore 26b along the axis A. The recess 86 extends transversely through the cylindrical body 84 to the axial opening 88. The recess 86 and axial opening 88 are configured such that the ball-shaped portion 28b may be transversely inserted into the recess 86 so that the ball pull 14b aligns axially with the draw stud 14b along the axis A. And, the axial opening 88 is sized to inhibit the ball-shaped portion 26b from being removed axially from the connector 82. More specifically, as shown in FIG. 12, the recess 86 includes a width W1 greater than a width W2 of the ball-shaped portion 26b, thereby creating a sufficient clearance for insertion of the ball-shaped portion 26b therethrough. However, a width W3 of the axial opening 88 is less than the width W2 of the ball-shaped portion 26b, thereby preventing the ball-shaped portion 26b from being pulled from the axial opening 88.

With reference to FIG. 14, the body 84 of the connector 82 defines the bore 26b and includes coarse thread segments 32b and unthreaded portions 34b adjacent the coarse thread segments 32b, extending the length of the bore 26b. The individual threads in each thread segment 32b may be helical (i.e., define a helix angle relative to a longitudinal axis of the connector 82) or oriented transverse to the longitudinal axis of the connector 82. Likewise, the individual threads in each thread segment 58b may be helical (i.e., define a helix angle relative to the longitudinal axis A of the draw stud 18b) or oriented transverse to the longitudinal axis A of the draw stud 18b. The bore 26b extends through the connector 82 and into the recess 86. The connector 82 also includes a bore 36b (FIG. 13) that extends through the cylindrical body 84 of the connector 82 and that is configured to receive a stop lug 38b (FIG. 14). A distal end of the stop lug 38b extends into the cylindrical bore 26b and is positioned adjacent the recess 86 and one of the thread segments 32b. In addition to preventing the connector 82 and the draw stud 18b from being rotated beyond the first and second relative orientations by limiting the extent to which the thread segments 32b, 58b can engage, the stop lug 38b inhibits the second end 54b of the draw stud 18b from being inserted through the bore 26b and into the recess 86. In some embodiments, the connector 82 includes three bores 36b spaced apart from each other by approximately 120 degrees about the axis A, and a corresponding stop lug 38b in each bore 36b.

The draw stud 18b is connected to the connector 82 in the same manner as the draw stud 18a is connected to the ball pull 14a of the draw stud assembly 10 of FIGS. 8-11. Specifically, the second end 54b of the draw stud 18b is inserted into the bore 26b of the connector 82 while the thread segments 58b, 32b of the draw stud 18b and the connector 82, respectively, are positioned in the first relative orientation. The draw stud 18b is then rotated relative to the bore 26b to the second relative orientation, thereby engaging the thread segments 58b, 32b of the draw stud 18b and the connector 82, respectively, to lock the draw stud 18b to the connector 82, inhibiting relative axial movement of the draw stud 18b. The draw stud 18b and the bore 26b are rotated relative to each other by approximately 60 degrees about the axis A between the first and second relative orientations. Thereafter, the ball-shaped portion 28b of the ball pull 14b, which is connected to a piston of a knockout punch or driver by the threaded end 78, is transversely inserted into the recess 86 of the connector 82.

To disconnect the draw stud 18b from the connector 82, the draw stud 18b is rotated from the second relative orientation back to the first relative orientation, during which the thread segments 58b, 32b are misaligned and disengaged. Thereafter, the draw stud 18b is axially removed from the connector 82.

Various features and advantages of the invention are set forth in the following claims.

What is claimed is:

1. A draw stud assembly for use with a knockout punch tool having a movable piston, the draw stud assembly comprising:
    a connector including one of a protrusion or a recess, the one of the protrusion or the recess configured to enable the connector to be attachable to the movable piston;
    a draw stud; and
    a quick connect mechanism including mating first and second thread segments on the connector and the draw stud, respectively;
    wherein the connector and the draw stud are movable between a first relative orientation where the mating first and second thread segments are misaligned to permit axial movement between the connector and the draw stud, and a second relative orientation where the mating first and second thread segments are aligned and engaged to inhibit axial movement between the connector and the draw stud; and
    wherein the draw stud defines a longitudinal axis, and wherein the connector and the draw stud are relatively rotatable about the longitudinal axis between the first relative orientation and the second relative orientation; and
    wherein the quick connect mechanism further includes
        a stop member, coupled to one of the connector or the draw stud, engageable with a first side of an unthreaded portion on the other of the connector or the draw stud to limit an extent to which the connector is rotatable relative to the draw stud in a first direction, and
        a notch formed on a second side of the unthreaded portion into which the stop member is receivable to limit an extent to which the connector is rotatable relative to the draw stud in a second direction opposite the first direction.

2. The draw stud assembly of claim 1, wherein the quick connect mechanism further includes a control thread segment adjacent one of the first thread segment or the second thread segment, wherein the control thread segment inhibits the connector and the draw stud from being moved from the first relative orientation to the second relative orientation when the control thread segment is circumferentially aligned with any threads in the other of the first thread segment or the second thread segment.

3. The draw stud assembly of claim 2, wherein the control thread segment is located on the draw stud axially adjacent the second thread segment.

4. The draw stud assembly of claim 2, wherein the control thread segment includes a thickness greater than a pitch between individual threads in either the first thread segment or the second thread segment.

5. The draw stud assembly of claim 2, wherein the draw stud includes a first end and a second end opposite the first end, and wherein the control thread segment is on the second end.

6. The draw stud assembly of claim 5, wherein the control thread segment is adjacent the second thread segment.

7. The draw stud assembly of claim 1, wherein the stop member is coupled to the connector, and wherein the notch and the unthreaded portion are defined on the draw stud.

8. The draw stud assembly of claim 7, wherein the stop member is adjacent the first thread segment.

9. The draw stud assembly of claim 7, wherein the draw stud includes a first end and a second end opposite the first end, and wherein the notch is defined in the second end of the draw stud.

10. The draw stud assembly of claim 1, wherein the quick connect mechanism further includes mating third and fourth thread segments on the connector and the draw stud, respectively.

11. The draw stud assembly of claim 10, wherein the connector defines a longitudinal axis, and wherein the first and third thread segments on the connector are in facing relationship on opposite sides of the longitudinal axis.

12. The draw stud assembly of claim 10, wherein the quick connect mechanism further includes fifth and sixth thread segments on the connector and the draw stud, respectively, wherein the first, third, and fifth thread segments are equally spaced around the longitudinal axis of the connector, and wherein the second, fourth, and sixth thread segments are equally spaced around a longitudinal axis on the draw stud.

13. The draw stud assembly of claim 1, wherein the quick connect mechanism further includes first and second unthreaded portions of the connector and the draw stud, respectively, wherein the first thread segment is in facing relationship with the second unthreaded portion of the draw stud when in the first relative orientation, and wherein the second thread segment is in facing relationship with the first unthreaded portion of the connector when in the first relative orientation.

14. The draw stud assembly of claim 1, wherein the connector includes a cylindrical body, and wherein the first thread segment is defined within a cylindrical bore in the cylindrical body.

15. The draw stud assembly of claim 14, wherein the connector includes a ball-shaped portion extending from an end of the cylindrical body opposite the cylindrical bore.

16. The draw stud assembly of claim 14, wherein the connector includes an axial opening on an end of the cylindrical body opposite to the cylindrical bore, and a recess extending transversely through the cylindrical body to the axial opening.

17. The draw stud assembly of claim 16, further comprising a ball pull directly attachable to the movable piston, wherein the ball pull includes a ball-shaped portion insertable through the recess and into the axial opening of the connector, wherein the axial opening is sized to inhibit the ball-shaped portion from being removed axially from the connector.

18. The draw stud assembly of claim 17, wherein a width of the recess is greater than a width of the ball-shaped portion of the ball pull, and wherein a width of the axial opening is less than the width of the ball-shaped portion.

* * * * *